United States Patent [19]

Henson et al.

[11] 4,369,845
[45] Jan. 25, 1983

[54] OIL WELL BLOW-OUT CONTROL

[75] Inventors: George S. Henson, Grange-over-Sands; Joe Brooks, Emsworth, both of England

[73] Assignee: Mobell Blowout Services Limited, Dyce, England

[21] Appl. No.: 171,843

[22] Filed: Jul. 24, 1980

[30] Foreign Application Priority Data

Jul. 26, 1979 [GB] United Kingdom ............... 7926138
Mar. 3, 1980 [GB] United Kingdom ............... 8007108

[51] Int. Cl.³ ............... E21B 29/08; E21B 29/12; E21B 33/037; E21B 33/076
[52] U.S. Cl. .................. 166/298; 137/318; 137/320; 166/90; 166/55.2; 166/292; 166/356; 166/379; 408/99; 408/108
[58] Field of Search ............... 166/55, 55.2, 356, 363, 166/362, 361, 75 R, 85, 86, 88, 298, 315, 89, 90, 379, 380, 387; 408/87, 88, 94, 99, 103, 105, 108; 137/317, 318, 320

[56] References Cited

U.S. PATENT DOCUMENTS

| 1,879,160 | 9/1932 | Fowzer. | |
|---|---|---|---|
| 2,840,166 | 6/1958 | Eckel et al. | 137/318 X |
| 3,202,216 | 8/1965 | Watts et al. | 166/356 |
| 3,631,928 | 1/1972 | Dalzell | 166/363 X |
| 3,647,000 | 3/1972 | Rowley et al. | 166/362 X |
| 3,717,202 | 2/1973 | Burrow | 166/55 |
| 3,821,965 | 7/1974 | Reynolds | 137/318 |
| 3,993,137 | 11/1976 | Hefetz | 166/55 X |
| 4,105,358 | 8/1978 | Walker | 408/108 |

Primary Examiner—Stephen J. Novosad
Attorney, Agent, or Firm—Wenderoth, Lind & Ponack

[57] ABSTRACT

A tool jig for bringing an implement to bear on an inner tubular 10 of a multi-tubular blown well includes a support 1 attachable to the outer tubular 2 and a tool holder 12. The tool holder has a hollow bore and a valve 24. At its rear end the tool holder is threaded for coupling on an implement and has at its front end a saddle seal for sealing the implement with the inner tubular, via through a window 9 in outer tubular 2. A back-up unit 18 abuts the inner tubular opposite the tool holder 12. The support 1 supports the tool holder 12 and back-up unit 18 via connecting brackets 13, 19. Screw jacks 22 acting through the support clamp the tool holder and backup unit in position.

29 Claims, 11 Drawing Figures

OIL WELL BLOW-OUT CONTROL

The present invention relates to apparatus and a method for use in re-establishing control of liquids and gases in a multi-tubular wild-well. The invention is particularly though not exclusively suitable for wells offshore.

A hydro-carbon well consists of a number of tubular members including casing and production tubing. These are sometimes known as "tubes". In this specification, the term "tubular" is used generically to refer to all such tubular members.

A typical well in the North Sea comprises a 30" diameter outer tubular, known as a conductor, with 20", 13⅜" and 9⅝" inner tubes known as casings, arranged within each other inside the conductor. Inside the 9⅝" tubular, known as the production casing, there may be present during a blow-out either no further tubular, or 7" production tubing or other tubing or a drill string for example. While such arrangements of tubulars are the norm, it should be borne in mind that variations are possible, for example there may be a combined 20" conductor and casing. Consequently the apparatus and methods of the invention have been developed to provide a flexible response to any individual well situation, in the North Sea or elsewhere.

In a producing well, the production tubing is in communication with the subterranean hydrocarbon bearing formation where the hydrocabon gas or liquids are under considerable pressure. This pressure is normally contained by the production tubing. However due to a number of possible causes often associated with a workover when well equipment such as down-hole shut off valves or possibly the production tubing itself may be being replaced and when blow-out preventers are not successfully closed when the well may become wild; that is an uncontrolled hydrocarbon flow escapes from the well at the surface through the production tubing for example. One traditional method of bringing a wild well under control is to set fire to the well to avoid pollution and then cut off the well held and cap the well with special equipment. This method involves the use of explosives also to extinguish the fire. On a modern production platform, such as developed for the North Sea, this method is greatly handicapped due to the close proximity of other equipment and structures. Further, large vessels adrift in storms have closely approached platforms and are capable of destroying well integrity, creating an underwater blow-out. Then, there are only two alternatives: which are bottom entry by drilling relief wells and side entry. Bottom entry will not be achieved and control regained for many weeks or even months. The present invention was devised during a program to provide a quicker wild well control capability, using side entry. By side entry is meant an entry through the side of the well, generally under water.

Side entry involves partly or completely cutting away the conductor and at least some of the casing tubulars. As explained in our British patent application No. 8,007,108 it is likely to be judged inadvisable to cut a sizeable window into the innermost annulus; for example the annulus between the 9⅝" and 7" tubulars, for the reasons detailed in that application. That application describes a method and some apparatus for plugging an annulus. In use of the present invention, it is quite possible that a plugging operation will be involved. However the present invention is in no way restricted by this fact.

To effect side entry into a wild well it is necessary to bring various implements to bear on one or more of the inner tubulars of the well. It is convenient if these implements can be detachably connected to a jig attached to an inner tubular. It is the object of the invention to provide such a jig and a method of use thereof. In practice the jig may include equipment to provide a working environment on the well and may also be provided in combination with implements fitting into the jig in sequence, as may be needed by the particular circumstances of the blow-out, all laid out for on-site selection from a ready-use blow-out control kit.

Figure 3:
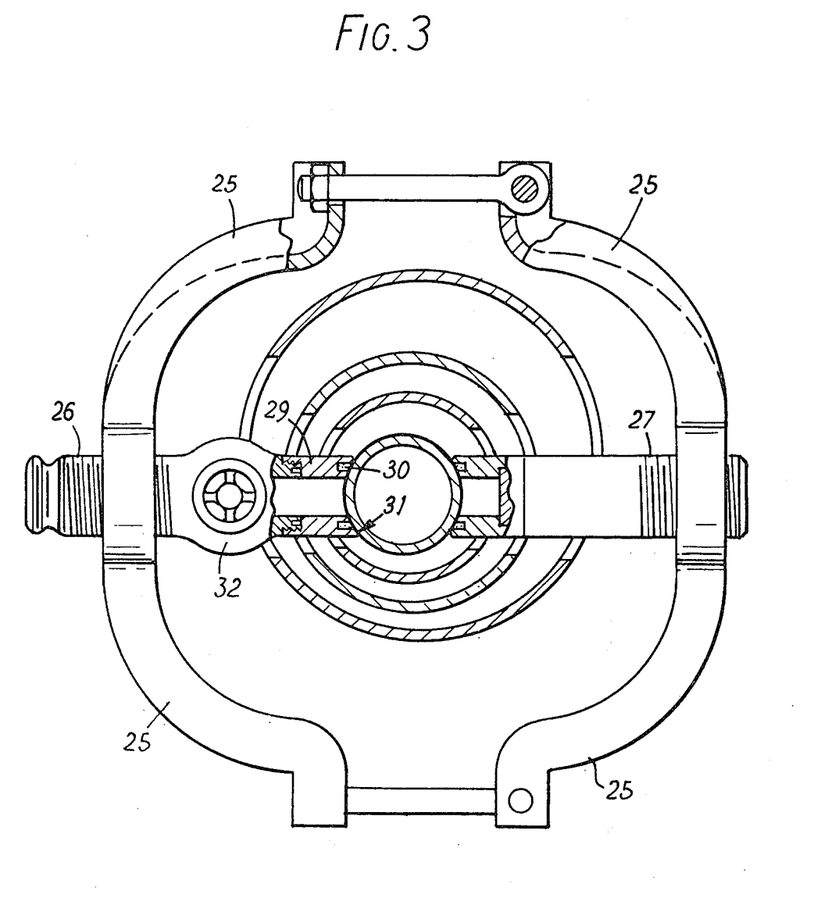
FIG. 3 is a view similar to FIG. 1 of another embodiment of the invention.

The tool jig of the invention as shown in FIG. 3 comprises a support attachable to the outermost tubular; a tool holder having a central bore, being adapted for a detachable-sealing connection of an implement to the tool holder at one end of the bore and having a face at the other end of the bore adapted for sealingly abutting an inner tubular; a saddle seal surrounding the said other end of the bore and a valve for closing off the bore; a back-up unit for abutting the inner tubular opposite the tool holder; clamping means for clamping the tool holder and the back-up unit to the inner tubular opposite each other and a supporting connection for supporting the tool holder and back-up unit from the support prior to clamping thereof to the inner tubular.

Usually the support and supporting connection will only provide the tool holder and back-up unit with initial support prior to clamping thereof. It is envisaged that where possible the tool holder and back-up unit will be welded to the inner tubular.

Preferably resilient mounts are provided for interposition between the outer tubular and the support to provide a degree of isolation between the outer tubular and the support. This is particularly useful where the tool holder, back-up unit and support are rigidly interconnected since the inner tubular is expected to be vibrating with respect to the outer tubular.

In one embodiment the support is adapted to surround and attach to the outer tubular at one end possibly two pairs of opposite windows therein, the support being provided with opposite apertures to provide access for the tool holder and the back-up unit via the windows to the inner tubular. Usually it will be necessary, for reasons which are explained below, to bring implements to bear at two separate levels. Thus the ready-use kit may contain two supports. Alternatively the support may be long enough to accommodate two pairs of longitudinally spaced apertures.

Conveniently the support comprises two semi-circular shells of steel plate, each having one of each pair of apertures, the semi-circular shells being hinged together along one axial joint and boltable together along an opposite axial joint.

For attachment of the tool holder to this support, the tool holder will usually include at least one pair of support legs securable to the support. The back-up unit will usually be similarly provided with support legs. Preferably two pairs of legs are provided for both the tool holder and the back-up unit, for stability.

To accommodate eccentricity of the outer and inner tubulars, the securing positions of the tool holder and the back-up unit on the support may be adjustable. This may be achieved by providing a plurality of discrete positions or by providing movable positions which are adjustable for example along guides.

Preferably with this support the clamping means acts through the support and includes at least one jack operable between the support and the tool holder or between the support and the back-up unit to urge the tool holder and back-up unit towards each other. The jack may be a screw jack and may be incorporated in the tool holder or the back-up unit. Provision of a jack on both the tool holder and the back-up unit enables eccentricity of the inner tubular with respect to the outer tubular to be accommodated. The legs may be detachable from the tool holder and the back-up unit with the jack interposable between the holder and its legs or the unit and its legs.

In another embodiment of the tool holder and the back-up unit, they are intended to be slung from the support which is to be attached to the outer tubular above the position of operation on the inner tubular. In this case the support may be a protective hood, preferably provided in two complementary halves attachable together to surround the outer tubular, each half including its own buoyancy chambers to provide neutral buoyancy in water.

Alternatively the support may comprise a structure including structural members attachable to the outer tubular both above and below the position of operation on the inner tubular and a working platform at this position. With this support, supporting slings may also be used for the tool holder and back-up unit or connection points may be provided on the platform. These may be in the same form as the securing positions provided on the support of the first embodiment. To accommodate eccentricity of the tubulars, the connection points may be adjustable.

A possible additional function of these structures is to reinforce the conductor to allow extra large windows to be cut therein, which would otherwise unduly weaken the conductor. Slips which tighten under the compressive load in the conductor or explosively inserted bolts may be used to secure the structure. The protective hood may be used in conjunction with the structure, for reasons explained below, and may be similarly secured. Possibly, the hood and the structure may be combined in one assembly.

A function of the hood is to protect a working environment around the conductor in the region of the tool holder from debris, and thereby enable divers to work regardless of fire conditions on the platform. This protective function makes it desirable to use the protective hood with a structure, as just mentioned, and to use it with the first embodiment of the support. The structure may further protect the working environment by including a tide shield. It may also include a trunk structure for maintaining an inert gas welding atmosphere therein.

Where the tool holder and back-up unit are slung from a support above the position of operation on the inner tubular, large vibrations of the inner tubular with respect to the outer tubular can be accommodated, and because the clamping means cannot function from the support, it is attached directly between the tool holder and the back-up unit. In this arrangement, the clamping means comprises a beam extending on both sides of the tool holder, a beam extending on both sides of the back-up unit and clamping bolts extensible between respective ends of the opposite beams. Preferably, the two beams are similar and are threadably attached to the tool holder and the back-up unit.

In order to enable the tool holder to bring implements to bear on inner tubulars of varying diameters, the tool holder face is preferably provided on a replaceable adaptor to enable the face and its saddle seal to conform to the particular diameter of the inner tubulars.

One implement provided in the blow-out control kit for use in combination with the tool jig is a boring machine having a body sealable to the tool holder when connected thereto, a spindle adapted to carry an interchangeable boring tool, means for advancing and withdrawing the spindle with respect to the body and through the bore of the tool holder for boring into the inner tubulars, means for sealing the spindle to the body during advance and withdrawal and a drive unit for rotating the spindle. Although the advancing and withdrawing means is preferably a hydraulic or pneumatic actuator it may be a mechanical drive.

Another such implement may be a through bar for blocking may be the innermost tubulars and a through bar advancing mechanism. This advancing mechanism may be a boring machine, in which case the through bar is the spindle of the machine or a rod in which the spindle is rotatably accommodated or a bar fitted in place of the boring tool, perhaps with a boring tool fitted to its forward end. Alternatively the advancing mechanism may be an injection tool as described in our patent application No. 8,007,108, in which case the advanceable barrel of the injection tool becomes the through bar.

A third such implement may be an annulus plugging or tubular blocking material injection tool including a barrel chargeable with the said material and sealable to the tool holder, a piston for displacing the said material from the barrel into the inner tubulars via the tool holder bore and means for advancing the piston for displacement of the material and sealing the barrel the inner tubular.

A fourth such implement may be a high pressure hose having a connector adapted to be detachably sealed to the tool holder, for injection of large quantities of materials into tubing and annuli.

According to another aspect there is provided a method of hot-tapping a multi-tubular well consisting of the steps of cutting a pair of opposite windows in the outer tubular, attaching the support of a tool jig, clamping the tool holder and back-up unit to the inner tubular, connecting a boring machine to the tool holder and boring into the inner tubular.

A usual preliminary to hot-tapping will be a radiographic survey of the well, to determine the most advantageous position for the hot tap(s). However this survey forms no part of the present invention.

Subsequent to the survey, the following stages, likely to be adopted where the 9⅝"–7" annulus may be blowing and a 7" production tubing is blowing, are detailed below. A further preliminary stage may be to fill outer annuli with cement via the high pressure hose to stabilize them. Once windows are cut in the 30", 20" and 13⅜" tubulars with shaped explosive charges, the stages are:

(a) The tool jig is positioned with the tool holder clamped onto the 9⅝" tubular. The boring tool is connected thereto.

(b) A small diameter tapping drill, which may be used with a trepanning tool is used in the boring machine to bore through the 9⅝" tubular.

(c) The machine spindle is withdrawn and the annulus pressure tested. This is either done with a built-in pressure gauge or by disconnecting the boring machine, having first closed the tool holder valve, and replacing it with a pressure gauge.

(d) Pressure in the annulus is bled off if necessary and feasible, which will not be the case if the annulus is blowing.

(e) The boring machine is used again with the trepanning tool to bore a full sized hole in the 9⅝" tubular.

(f) The annulus is plugged if necessary, whether blowing or if static with the risk of blowing: the latter as described in application No. 8,007,108. Injector tools are used for these plugging operations.

(g) A second tool jig and the boring machine are used to bore through the 9⅝" tubular, any annulus plug and the 7" at a position spaced from the original tapping. The first tool jig and the boring machine are used again to bore through the plug and 7" tubular at the original position.

(h) The boring machine at the upper position is used to bore into the far side of the 7" tubular to form a support for its rod which becomes a through bar.

(i) A second injection tool is used for injecting blocking material into the 7" tubular to form a block against the through bar.

(j) The second injection tool is replaced by a mud hose and mud is pumped down the 7" tubular to bring the well fully under control.

To help understanding of the invention, various specific embodiments thereof will now be described with reference to the accompanying drawings in which.

Figure 1:
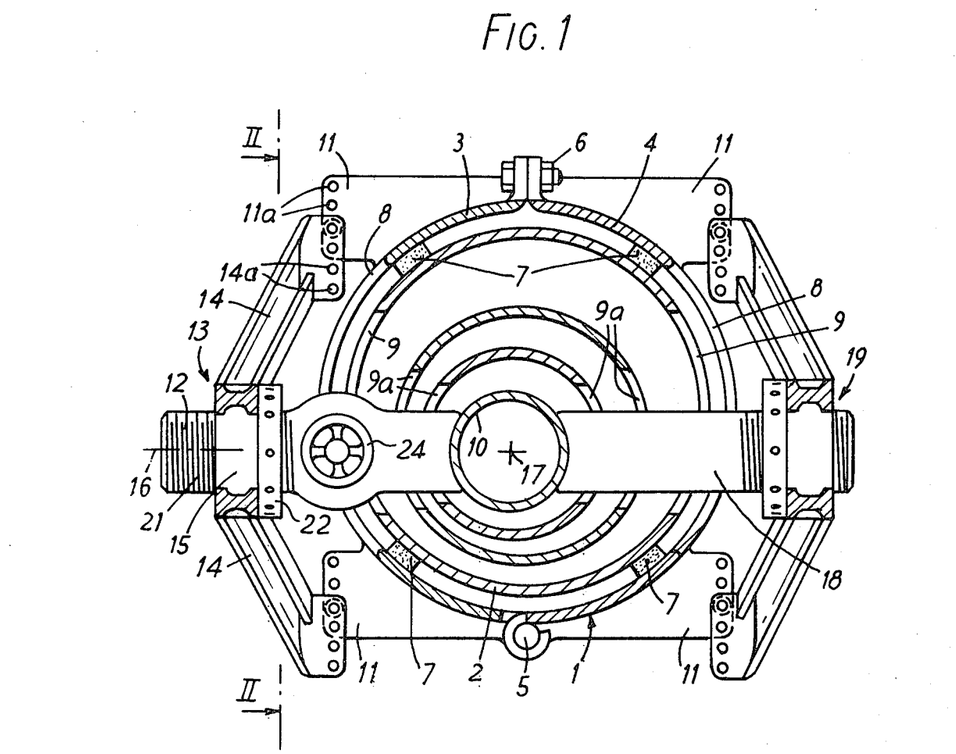
FIG. 1 is a plan view, in section, of an underwater multi-tubular well and a tool jig in accordance with the invention.
Figure 2:
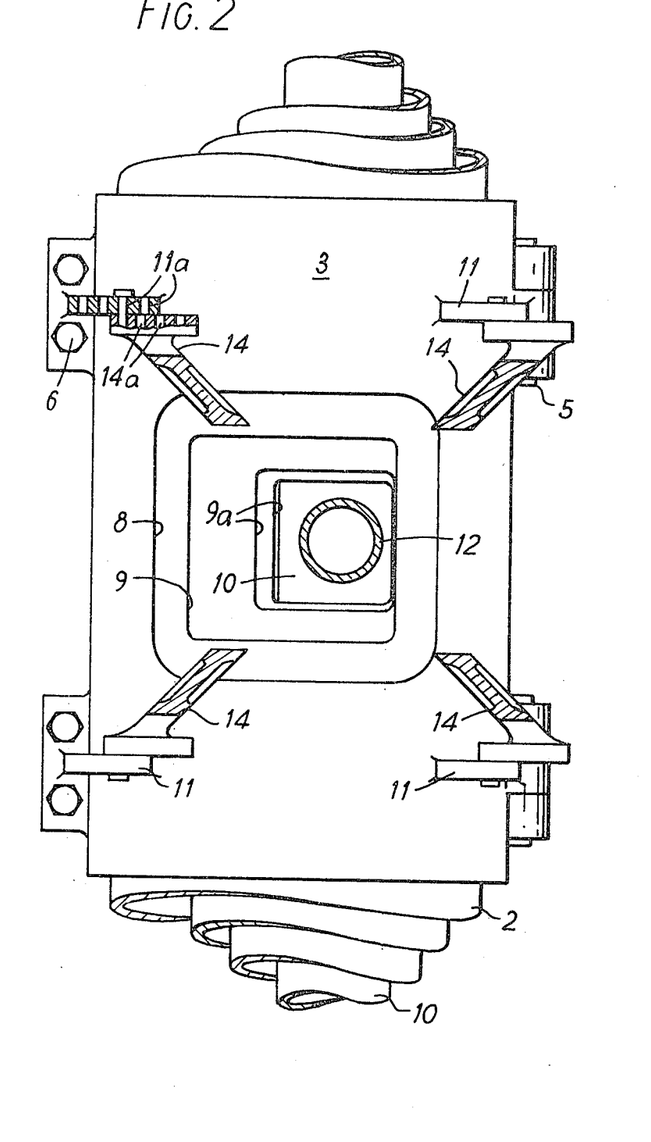
FIG. 2 is a side view taken along the line II—II in FIG. 1.

Referring now to FIGS. 1 and 2, there is shown a tool jig having a support 1 which is attached to the outer tubular 2 of a multi-tubular well. The tool jig has two semi-circular shells 3, 4, which are hinged together at 5 and bolted together at 6. Attachment is effected upon bolting at 6 by compression of rubber blocks 7 which are secured to the shell 3, 4 and grip the outer tubular when compressed. The blocks, acting in shear, may not be capable of supporting the weight of the support and supported equipment. Thus the support may be slung from bolts (not shown) placed in the outer tubular above the support or from a protective hood (see below). Each shell has an aperture 8 which is aligned with a window 9 cut in the outer tubular, preferably by use of formed flexible, plastic explosive charges. Further windows 9a are similarly cut in the inner tubulars except the innermost tubular 10. The apertures and windows provide access to the inner tubular 10.

Welded to each shell are four lugs 11 in upper and lower pairs. To one shell 3 of the support a tool holder 12 is connected by a connecting bracket 13 having four legs 14 radiating from a yoke 15, the tool holder extending through the yoke. Since the inner and outer tubulars may not be concentric, each lug 11 is provided with a number of bolt holes 11a. Similarly, a number of bolt holes 14a are provided in the legs, with the pitch of the holes 11a slightly different from that of the holes 14a to allow for fine adjustment of the position at which the backet 13 is bolted to the shell 3 of the support 1. Thus the axis 16 of the tool holder 12 may be aligned with the central axis 17 of the inner tubular, as shown.

To the other shell 4 of the support a back-up unit 18 is similarly supported by another bracket 19. The back-up unit 18 bears against the inner tubular opposite to and coaxially aligned with the tool holder. To clamp the tool holder 12 against the inner tubular 10, a screw jack arrangement is provided in the form of a screw thread 21 on the tool holder and a nut 22 on the thread 21 which nut works against the side of the yoke nearest to the inner tubular to urge the tool holder 12 towards the inner tubular 10. A similar screw jack arrangement is provided for the back-up unit. Thus the tool holder and back-up unit can be clamped rigid with the inner tubular via the support, and accommodate eccentricity between the inner and outer tubulars. The tool holder may be welded to the inner tubular when clamped in position.

Figure 4:
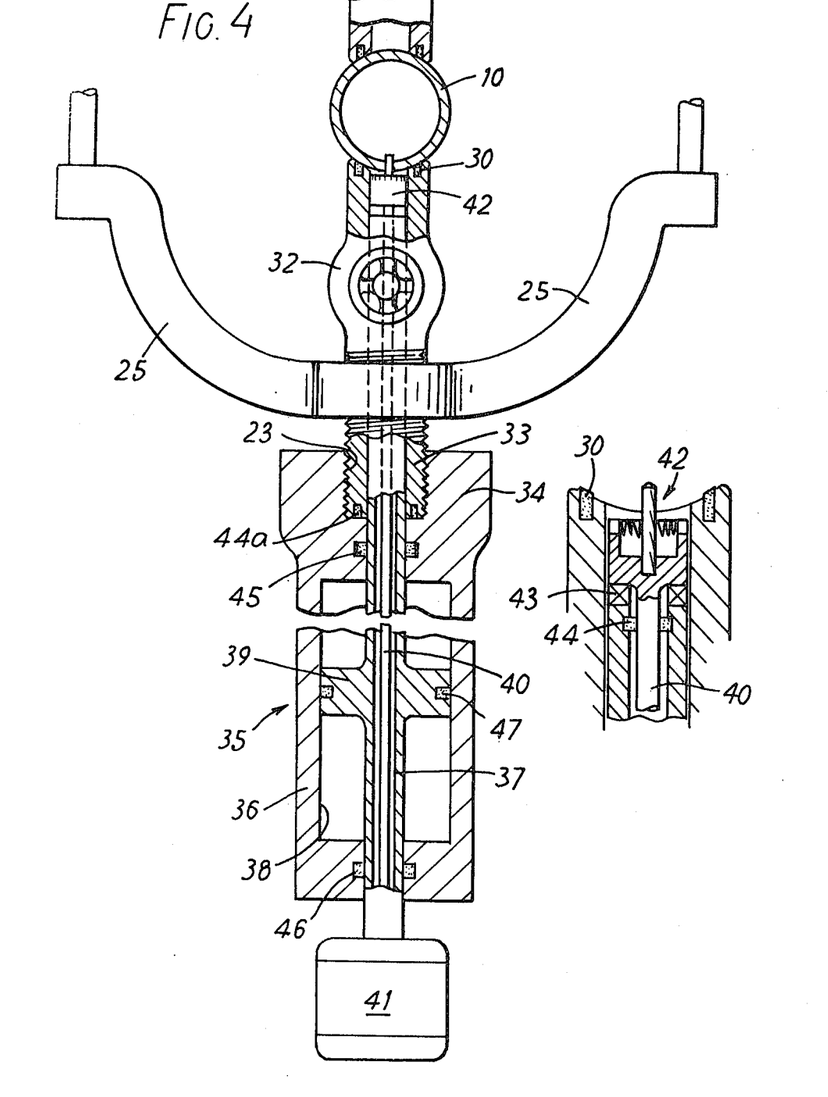
FIG. 4 is a more detailed plan view of the embodiment of FIG. 3 including a boring machine.

The tool holder is provided with a valve 24 for containing the pressure in the inner tubular once hot-tapping has been performed with a boring machine, see FIG. 4, which is connectable to the holder via a quick release screw coupling.

Figure 5:
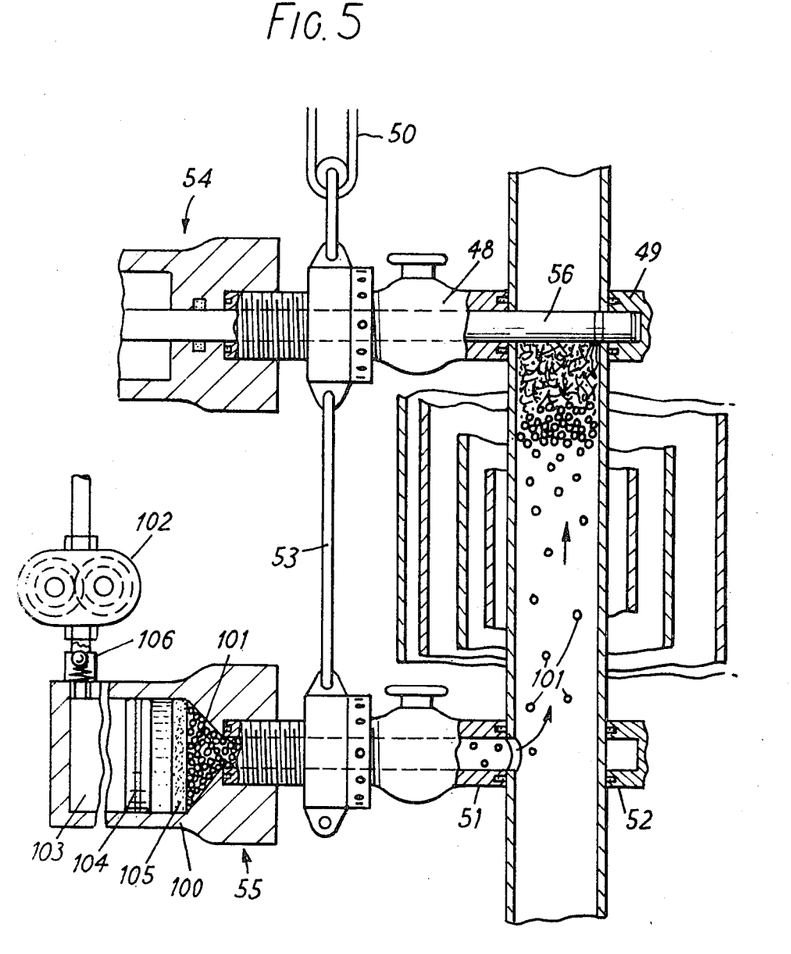
FIG. 5 is a simplified side view in section on the axis of an inner tubular showing the use of two tool jigs in accordance with the invention in combination with a through bar advancing mechanism and a blocking material injection tool in use to block off upwards hydrocarbon flow in the tubular.

FIGS. 3 and 4 show an alternative tool holder 26 and back-up unit 27. They are supported prior to clamping by slings, such as shown in FIG. 5, from a protective hood 59, see FIG. 7. FIG. 3 shows clamping means which includes a pair of arms 25 on the tool holder 26 and the back-up unit 27. Each pair of arms is in the form of a beam which is threadably attached to the tool holder or back-up unit. Between the arms extend clamping bolts for clamping the units to the inner tubular.

As shown in FIG. 3, a replaceable adaptor 29 having a saddle seal 30 is provided at the front end of the tool holder 26 for snugly abutting the inner tubular. The adaptor may be unscrewed for a replacement having a front contour 31 suitable for an inner tubular of another diameter. A valve 32, similar to valve 24 in the first embodiment, is provided behind the adaptor 29 for closing off the cylindrical bore extending through the tool holder. A similar adaptor is provided on the back-up unit 27.

Referring now to FIG. 4, beyond the arms 25 at the rear end of the tool holder is a threaded boss 33, to which is treaded a union 34 on the front end of a boring machine 35, for locking the boring machine onto the tool holder. Extending rearwards from the union is a tubular member 36 which accommodates a piston rod 37. The tubular member has an increased diameter bore 38 in which is received a piston disc 39. Admission of pressurised fluid through unshown ports into the bore at either side of the piston disc will urge the piston rod in the corresponding direction.

Running the length of the piston rod is a drive spindle 40, which is driven by a drive unit 41 at the rear end of the piston rod and which drives a boring tool bit 42 at the front end of the piston rod. The boring tool bit 42 has a pilot/tapping drill and a trepanning cutter slightly set back from the drill. Bearings 43 and seals 44 are provided at the front end of the rod 37 for supporting the bit and for containing the pressure in the inner tubular after hot-tapping; a seal 44a between the boss 33 and the union 34 and a seal 45 between the tubular member 36 and the piston rod 37 are also provided for this purpose. For sealing the increased diameter bore 38, a seal 46 is provided at the rear end of the tubular member and a seal 47 is provided on the piston disc, while the seal 45 also seals the front end of the increased diameter bore 38.

A hot-tapping operation with this apparatus is carried out as follows. The support is attached to the conductor at the previously cut windows and the tool holder 26 and back-up unit 27 are fitted in alignment with each other and the inner tube. They are clamped to the latter. Next the pressure seal of the saddle seal 30 is tested by closing the valve 32 and pressurising the cylindrical bore adjacent the seal through unshown ports. If the seal is satisfactory, the boring machine 35 is then locked on at the boss 33. Introduction of a pressurized medium to the rear end of the bore 38 moves the tool bit into contact with the inner tubular, the valve in the tool holder 26 having been opened once once the boring machine 35 has been locked on the tool holder in pressure relation thereto. The drive unit 41 is now operated to perform the boring operation, the pressure being maintained at the rear end of the bore 38 to feed the tool bit forwards as it cuts into the inner tubular. The boring operation may be in two stages to allow for testing of pressure in the annulus when only the pilot/tapping drill has penetrated.

Near completion of a blow-out control operation is shown in FIG. 5. (Note that the usual innermost tubular and possibly plugged annulus are omitted for the sake of clarity). At an upper position, a tool holder 48 and a back-up unit 49 have been clamped on, after initial support from a protective hood (not shown) via slings 50. Below, at a lower position, a second tool holder 51 and a second back-up unit 52 have been clamped on after initial support via the further slings 53. Then a boring machine 54 has been used at the lower position to bore through the inner tubular. The machine 54 has been moved, with the valve in the lower tool holder closed, and placed in the upper position and replaced at the lower position by an injection tool 55. The injection tool comprises a barrel 100 from which blocking material 101 is injected. A pump 102 pumps sea water into the rear end 103 of the barrel behind a piston 104 which derives forward wadding 105 via the interposition of an oil/water mixture. A non-return valve 106 is provided to assist the pump in resisting not only the pressure in the inner tubular on injection but also the increased pressure expected on successful blocking of the tubular.

Prior to injection at the lower position, the valve in the upper tool holder 48 is opened and the inner tubular bored through on both sides. The tool bit passes into the back-up unit 49, with the rod of the drilling machine becoming a through bar 56. Injection of blocking material from the injection tool 55 is then started, the material being carried up, by flow in the inner tubular, to wedge and form a block at the bar 56. FIG. 5 shows the block formed and flow in the casing virtually blocked off.

Figure 6:
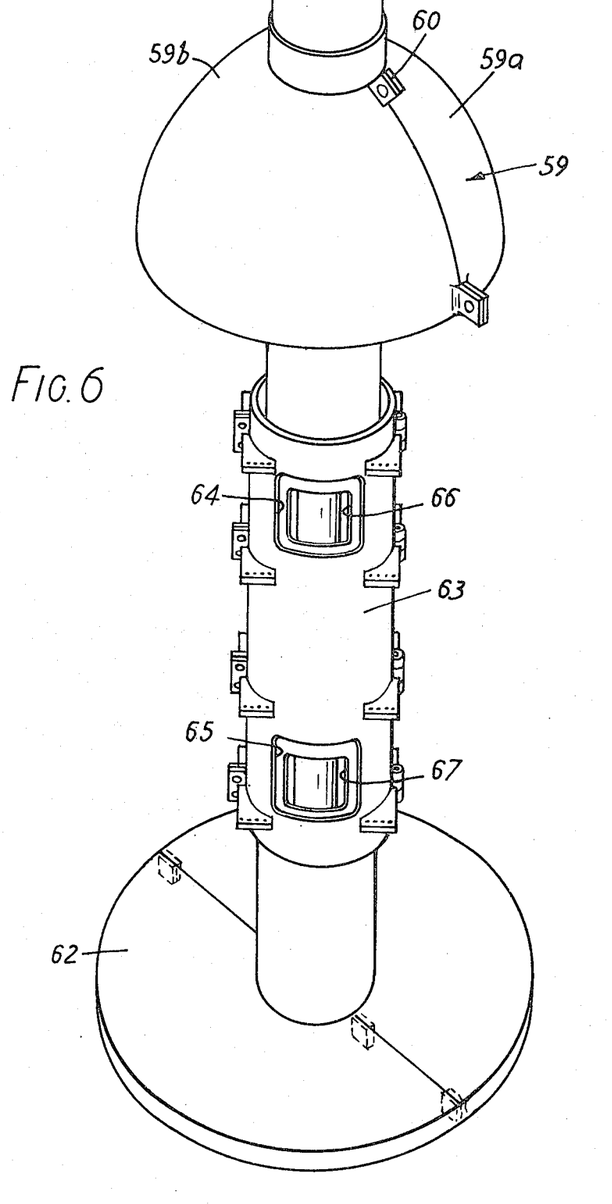
FIG. 6 is a perspective view of a protective hood, support and staging for use with the invention.

FIG. 6 shows an apparatus installed on a multi-tubular conductor as a preliminary to hot tapping/boring and blocking operations similar to those just described. A protective hood 59 is clamped to the outer tubular to protect the space around the conductor at which it will be hot-tapped from falling debris from the production platform. The platform is likely to be on fire and may be breaking up as a result of the blowing well. Although periods of rapid spread of fire can be avoided, the danger of falling debris cannot be completely removed, hence the desirability of the protective hood.

Figure 7:
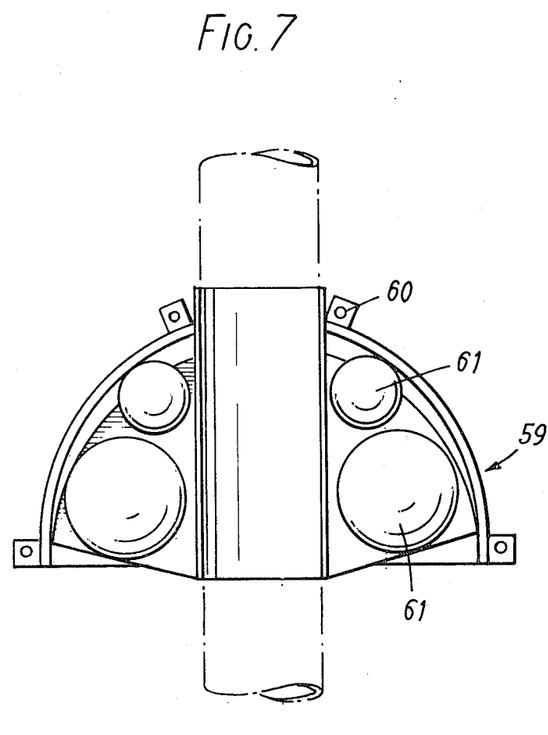
FIG. 7 is a vertical section of the hood of FIG. 6.

The protective hood is a substantial structure comprised chiefly of glass reinforced plastic material. In order to facilitate maneuvering of it into position it is in two halves 59a, 59b which are clamped together onto the outer tubular as at 60. FIG. 7 shows buoyancy chambers 61 installed in the hood so that it can be maneuvered at a controlled neutral buoyancy.

Below the hood at the bottom of the protected working environment, staging 62—also fabricated in two halves—is clamped to the outer tubular. Within the environment is clampled to the outer tubular a support 63 having upper and lower apertures 64, 65 in line with previously cut upper and lower windows 66, 67 in the outer tubular. The inner tubular can be seen through the apertures and windows. The support is for use with tool units and back-up units as described with reference to FIG. 1.

Figure 8:
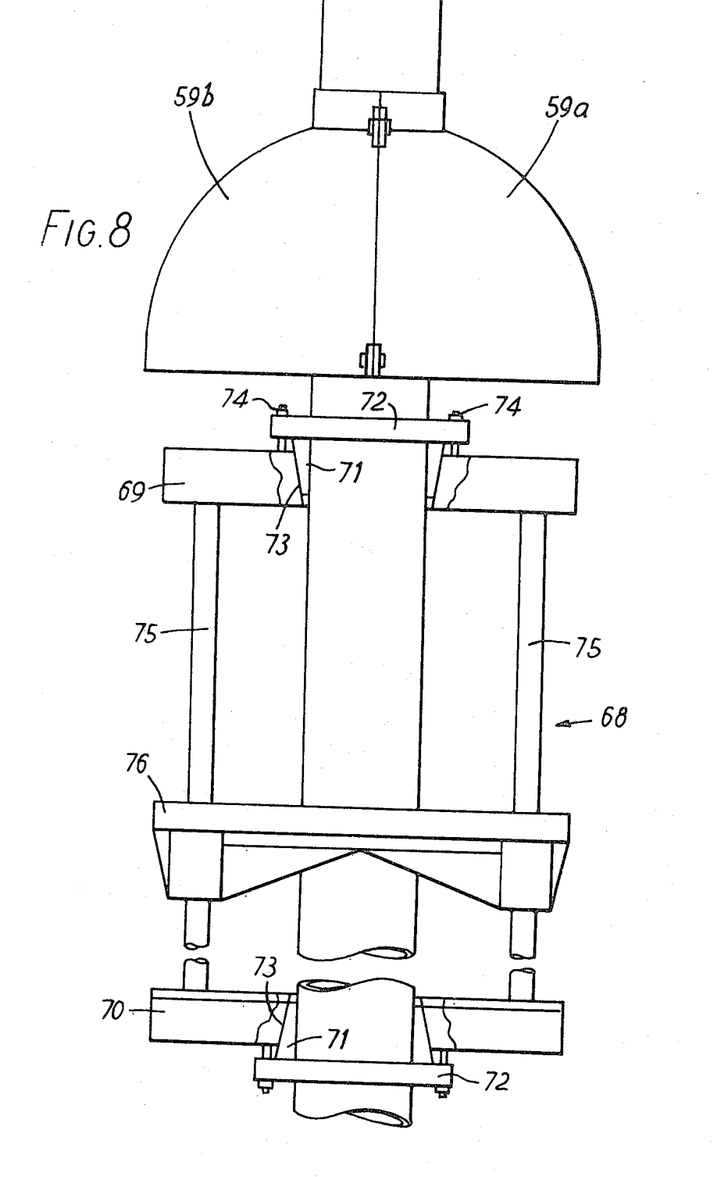
FIG. 8 is a side view of a conductor reinforcing structure for use with the invention.

FIG. 8 shows an outer tubular reinforcing structure 68 clamped to the outer tubular beneath a protective hood. The structure comprises top and bottom frameworks 69, 70 fabricated from steel plate. Each framework is clamped to the outer tubular by casing slips 71 which, as shown, are arranged to wedge more tightly when compression in the outer tubular displaces the clamped portions towards each other. Clamping rings 72 are provided at the thick ends of the slips to drive the slips into fixed engagement with the casing. The outer surfaces of the slips react against suitably tapered bores 73 in the frameworks. The clamping rings are driven by clamp bolts 74 as shown. Alternatively hydraulic rams could be used. Four structural columns 75, of which only two are shown and which preferably have a combined strength at least equivalent to that of the outer tubular, interconnect the frameworks. A working platform 76 is provided on the columns midway between the frameworks, and a further platform is provided on the bottom framework 70.

For ease of maneuvering into position, the structure 68 is in two halves which are clamped together when in position on the outer tubular. Since the structure has considerable weight, removable buoyancy chambers (not shown) are provided for floating the structure into position. Once the structure is positioned the buoyancy chambers are removed.

Figure 9:
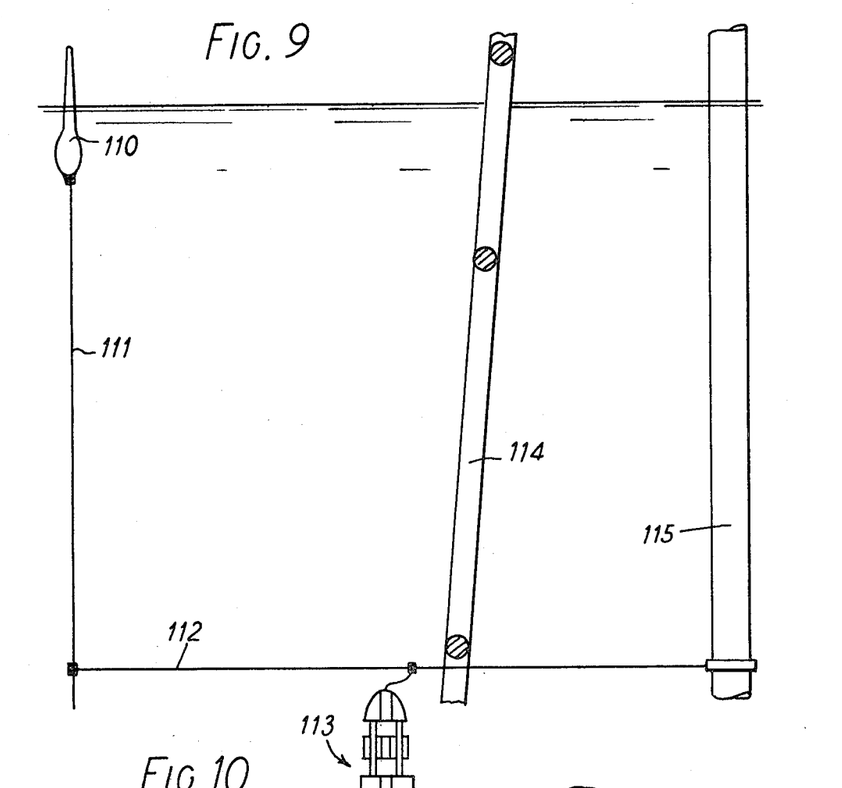
FIG. 9 is a general side view of an arrangement for moving equipment into a wild well.
Figures 10, 11:
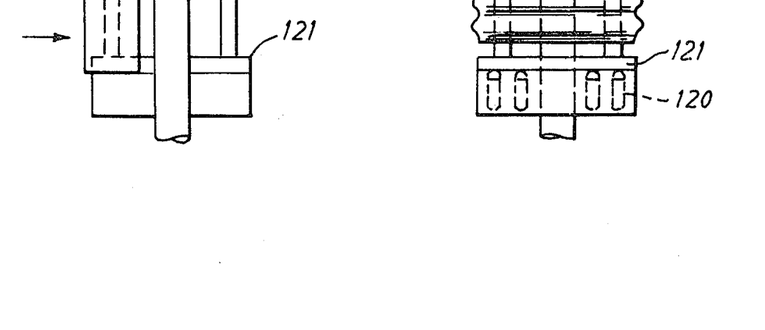
FIG. 10 is a side view of a support structure including a tide shield.
FIG. 11 is a side view of the support structure including an inert gas trunking.

FIG. 9 shows a hauling arrangement which may be used for moving equipment to the blown well. A low drift buoy 110 stably supports a cable 111. A horizontal transfer cable 112 extends from the cable 111 to guide equipment e.g. structure 113 through the platform legs 114 to the blown well 115. FIG. 10 shows a tide shield 116 attached to the uptide side of the structure for providing a protected environment 117 from the tide. The structure 113 is clamped to the well and includes its own protective hood 118. This contains buoyancy chambers 119. Gas bottles 120 for these chambers are accommodated under the working platform 121. FIG. 11 shows the tide shield replaced by trunk 122 for containing an inert gas atmosphere, supplied by the bottles 120, for facilitating welding.

The invention is not intended to be restricted to the details of the above described embodiments. In particular envisaged alternatives include firstly extensive cutting away or even complete removal of the outer tubular within the length of the structure of FIG. 8. The reinforcing structure would then be clamped to an inner tubular in addition to the outer tubular, preferably by the use of further slips.

Secondly in contrast to the arrangement of FIG. 5 which shows the through bar 56 received in the back-up unit 49, the through bar may be cantilevered from the tool holder side of the inner tubular. A special through bar advancing mechanism may be used which is similar in most respects to the boring machine except that the rod is replaced with a solid through bar. Thirdly the drive unit 41 in FIG. 4 may be detachable from the boring machine. Fourthly, quick release couplings other than the thread 23 may be used, for instance FIG. 3 shows a Vee coupling.

We claim:

1. A device for bringing an implement to bear on an inner tubular of a multi-tubular well for a blow-out control operation, said device comprising:
    a support attachable to an outer tubular of a well;
    an implement holder connected to said support and having a bore therethrough having first and second ends, and a valve for opening and closing communication through said bore, said implement holder being sealingly engagable with an inner tubular of a well at a peripheral edge of the first end and to detachably sealingly receive an implement at a peripheral edge of the second end;
    a back-up unit connected to the support and sealingly engageable with the inner tubular at a position diametrically opposite to said implement holder;
    a support connection for connecting said implement holder and said back-up unit to said support; and
    a clamping means for engaging said implement holder and said back-up unit with the inner tubular.

2. A device as claimed in claim 1 wherein the support is provided with resilient mounting blocks for interposition between the outer tube and the support.

3. A device as claimed in claim 1, wherein the support is adapted to surround and attach onto the outer tubular, the outer tubular having at least one pair of opposite windows therein, and the support has at least one pair of opposite apertures to provide access for the implement holder and the back-up unit via the one pair of windows to the inner tubular.

4. A device as claimed in claim 3 wherein the support comprises two semi-circular shells of steel plate, each having at least one of the pair of apertures, the semi-circular shells being hinged together along one axial joint and boltable together along an opposite axial joint.

5. A device as claimed in claim 3 wherein the implement holder includes at least one pair of first support legs securable to the support.

6. A device as claimed in claim 5, wherein said back-up unit includes at least one pair of second support legs securable to said support, and said implement holder and back-up unit are adjustable in a lateral direction relative to the direction of the longitudinal axis of the inner tubular.

7. A device as claimed in claim 3, wherein the back-up unit includes at least one pair of second support legs securable to the support.

8. A device as claimed in claim 3, wherein the clamping means includes at least one jack operable between the support and the implement holder or between the support and the back-up unit for urging the implement holder and back-up unit towards each other.

9. A device as claimed in claim 1 wherein the clamping means comprises a first beam extending on both sides of the implement holder, a second beam extending on both sides of the back-up unit and clamping bolts between respective ends of the beams.

10. A device as claimed in claim 9, wherein the two beams are structurally similar and are threadably attachable to the implement holder and the back-up unit.

11. A device as claimed in claim 1, wherein said implement holder includes a saddle seal on said first end for sealingly engaging said implement holder with the inner tubular.

12. A device as claimed in claim 11, wherein the first end peripheral edge has a replaceable adaptor for enabling the tool holder to sealingly engage the inner tubular of a given diameter.

13. A device as claimed in claim 1, wherein the support is a protective hood attachable to the outer tubular above the position at which a blow-out control operation is to be performed on the inner tubular and the support connection comprises slings extending from the protective hood for supporting the implement holder and the back-up unit.

14. A device as claimed in claim 13, wherein the protective hood comprises two complementary halves attachable together for surrounding the outer tubular, each half including buoyancy chambers for providing each half with a neutral buoyancy in water.

15. A device as claimed in claim 1, wherein the support comprises structural members attachable to the outer tubular both above and below the position at which a blow-out control operation, is to be performed on the inner tubular and a working platform at said position, and said support connection comprises slings extending from said structural members for supporting the tool holder and the back-up unit.

16. A device as claimed in claim 15, wherein:
    the implement is a boring machine;
    the bar includes a spindle rotatably and longitudinally movable within the boring machine, the spindle has an interchangeable tool bit for boring into the inner tubular;
    the boring machine includes a boring means for rotating the spindle; and a seal for sealing the spindle within the machine during spindle movement.

17. A device as claimed in claim 15, wherein the support includes buoyancy chambers for providing neutral buoyancy in water.

18. A device as claimed in claim 15 wherein the support includes a tide shield.

19. A device as claimed in claim 15 wherein the support includes a trunk for containing an inert gas welding atmosphere.

20. A device as claimed in claim 1, further comprising a boring mechanism including:
    a spindle rotatably and longitudinally movable within the boring mechanism;
    the boring mechanism being detachably sealingly connected to the implement holder for allowing the spindle to advance into and withdraw from the bore toward and away from the inner tubular;

the spindle having an interchangeable tool bit for boring into the inner tubular;

sealing means for sealing the spindle with the boring mechanism during spindle movement;

a driving means for longitudinally moving the spindle; and a rotating means for rotating the spindle.

21. A device as claimed in claim 20, wherein the driving means is a hydraulic or pneumatic actuator.

22. A device as claimed in claim 1, further comprising an implement including:

a bar at least partially positioned within the implement and movable away from the implement;

said implement being detachably sealingly connected to the implement holder for allowing the bar to advance into the bore and into the inner tubular through a hole bored therein; and an advancing means for advancing the bar.

23. A device as claimed in claim 1, further comprising an annulus plugging or tubular blocking material injecting mechanism detachably sealingly connected to said implement holder for injecting an annulus plugging or tubular blocking material through the bore and through a hole in the inner tubular, said mechanism including:

a barrel chargeable with the material to be injected into the inner tubular for plugging or blocking the inner tubular;

a piston movable in the barrel for, when the piston is displaced, displacing the material from the barrel into the bore and into the inner tubular; and a displacing means for displacing the piston against pressure in the inner tubular.

24. A device as claimed in claim 1, further comprising a high pressure mud hose detachably sealingly connected to the peripheral edge of the second end of said bore in said implement holder.

25. A device as claimed in claim 1, wherein the support comprises structural members attachable to the outer tubular both above and below the position at which a blow-out control operation is to be performed on the inner tubular and a working platform at said position, and said support connection comprises slings extending from said working platform for supporting the tool holder and the back-up unit.

26. A device as claimed in claim 1, wherein the support comprises structural members attachable to the outer tubular both above and below the position at which a blow-out control operation is to be performed on the inner tubular, a working platform at said position, and a protective hood attachable to the outer tubular above the position at which a blowout control operation is to be performed, and said support connection comprises slings extending from said protective hood for supporting the tool holder and the back-up unit.

27. A method of boring and blocking an inner tubular of a multi-tubular well during a blow-out control operation comprising the steps of:

(1) cutting a pair of opposite windows in diametrically opposite peripheral parts of an outermost tubular of the well;

(2) attaching a support to the outermost tubular;

(3) connecting an implement holder and a back-up unit to the support;

(4) inserting the implement holder and back-up respectively through the opposite windows;

(5) sealingly engaging a peripheral edge of a first end of a bore through the implement holder with the inner tubular;

(6) clamping the implement holder and back-up unit to the inner tubular;

(7) detachably sealingly connecting a boring mechanism to a peripheral edge of a second end of the bore;

(8) advancing a spindle which is sealingly engaged within the boring mechanism through the bore; and (9) boring a hole in the inner tubular with a tool bit attached to the spindle.

28. A method as claimed in claim 27, further comprising the steps of:

(10) cutting a pair of second opposite windows in diametrically opposite peripheral parts of the outermost tubular upstream of the first-mentioned opposite windows;

(11) connecting a second tool holder and back-up unit to the support;

(12) inserting the second tool holder and back-up unit respectively through the second opposite window;

(13) sealingly engaging a peripheral edge of a first end of a bore through the second tool holder with the inner tubular;

(14) clamping the second tool holder and back-up unit to the inner tubular;

(15) detachably sealingly connecting a second boring mechanism to a peripheral edge of a second end of the bore of the second tool holder;

(16) advancing a spindle which is sealingly engaged within the second boring mechanism through the bore of the second tool holder;

(17) boring a second hole in the inner tubular with a tool bit attached to the spindle within the second boring mechanism upstream of the first mentioned hole;

(18) inserting a bar through the first mentioned bore and into the first mentioned hole and into the inner tubular; and (19) injecting a blocking material into the bore of the second tool holder and into the second hole and into the inner tube for blocking the inner tubular.

29. A method as claimed in claim 28, further comprising the step of pumping mud from a high pressure hose into the bore of the second tool holder.

* * * * *